United States Patent [19]

Enderle et al.

[11] 3,989,192

[45] Nov. 2, 1976

[54] DEVICE FOR VARYING THE GAS EXIT AREA OF AN EXHAUST NOZZLE FOR A JET DEFLECTING DEVICE

[75] Inventors: Heinrich Enderle, Munich; Alfred Jabs, Groebenzell, both of Germany

[73] Assignee: Motoren- und Turbinen-Union Munchen GmbH M.A.N. Maybach Mercedes-Benz, Munich, Germany

[22] Filed: Feb. 28, 1975

[21] Appl. No.: 553,884

[30] Foreign Application Priority Data

Mar. 2, 1974 Germany............................ 2410161

[52] U.S. Cl............................ 239/265.35; 60/232; 239/265.39
[51] Int. Cl.²......................................... B64C 15/08
[58] Field of Search.................. 239/265.11, 265.19, 239/265.33, 265.35, 265.39, 265.37; 60/228, 230, 232; 244/12 D, 23 D

[56] References Cited
UNITED STATES PATENTS

| | | | |
|---|---|---|---|
| 2,932,163 | 4/1960 | Hyde............................. | 239/265.37 |
| 2,933,891 | 4/1960 | Britt.............................. | 239/265.35 |
| 3,260,049 | 7/1966 | Johnson........................ | 239/265.35 |
| 3,485,450 | 12/1969 | Kurti et al..................... | 239/265.35 |
| 3,687,374 | 8/1972 | Nash.............................. | 239/265.35 |
| 3,776,467 | 12/1973 | Riemerschmid............... | 239/265.35 |

Primary Examiner—Evon C. Blunk
Assistant Examiner—Andres Kashnikow
Attorney, Agent, or Firm—W. G. Fasse; W. W. Roberts

[57] ABSTRACT

A jet deflecting device has a first rotatable pipe section connected to the end of an engine jet pipe and a second pipe section rotatably connected to the end of the first pipe section. Nozzle flaps are provided at the end of the second pipe section, and coupled to be moved inwardly and outwardly in response to axial movement of a nozzle actuating skirt slidably mounted at the end of the second pipe section. A first drive motor on the stationary jet pipe directly rotates the first pipe section by way of driving gears. A second drive motor is coupled by gears to rotate the second pipe section independently of rotation of the first pipe section, and a third drive motor is provided for rotating an angular gear carrier on the second pipe section independently of the angular position of the two pipe sections. An angle drive mechanism is provided for converting rotational movement of the angular gear carrier to axial movement of the nozzle actuating skirt for control of the nozzle flaps. A common planetary gear arrangement may be provided for the second and third drive motors.

11 Claims, 10 Drawing Figures

DEVICE FOR VARYING THE GAS EXIT AREA OF AN EXHAUST NOZZLE FOR A JET DEFLECTING DEVICE

BACKGROUND OF THE INVENTION

This invention relates to get deflecting devices particularly adaptable for controlling the flow direction of exhaust gases from a jet engine, and is particularly directed to a device for varying the gas exit area of the exhaust nozzle at the end of the rearmost pipe section of the jet deflecting device, wherein the jet deflecting is of the type having at least two rotatably interconnected pipe sections at the downstream end of a stationary engine jet pipe.

German Offenlegungsschrift No. 2,056,088 and U.S. Pat. No. 3,776,467 disclose jet deflecting devices of the type having at least two rotatably interconnected pipe sections at the downstream end of a stationary engine jet pipe for a jet engine. Such jet deflection devices are provided in order to deflect the exhaust gas jet of an aircraft jet engine from a horizontal direction to a direction having vertical components of efflux in order to selectively provide for horizontal or vertical flight of the aircraft.

Arrangements of this type include means providing jet deflection positions for short take-off, wherein the exhaust gas jet issues diagonally downwardly at an angle of 30° to 45° with respect to the longitudinal center line of the aircraft.

In the actuating mechanisms disclosed in the above references, the jet deflecting devices may be controlled for movement in horizontal, as well as vertical direction, whereby aircraft incorporating such mechanisms may rapidly achieve maneuvers such as changes in pitch or roll attitude which are achieved by rudder or elevator control in conventional aircraft.

In the arrangements of the above references, the rearmost rotatable pipe section of the jet deflecting devices are provided with variable nozzles, in order to control the gas exit area to suit the mass flow in after burning operations and to decrease the mass flow when the after burner is inoperative.

In the design of known jet deflecting devices of the type having rotatably interconnected pipe sections, little or no attention has been paid to the design of a nozzle actuating mechanism, whereby the variable nozzle may be actuated from a point on the stationary engine jet pipe while taking into account different jet deflection angles of at least the rearmost pipe section carrying the variable nozzles. Any suitable design of the nozzle actuating mechanism must necessarily consider the individual movements of the pipe sections through equal or different angles of rotation. In other words, the entire exhaust gas jet system should be variable angularly not only in a vertical plane, but also in a horizontal plane to achieve three-dimensional actuation, by focusing the nozzle on any point within the confines of the cone determined by the number of rotatably mounted pipe sections, and by the relative inclinations of the inlet and outlet areas of the pipe sections.

OBJECTS OF THE INVENTION

In view of the above, it is the aim of the invention to achieve the following objects singly or in combination:

to provide a nozzle actuating mechanism for a jet deflecting device of the above type, wherein the nozzle control is substantially independent of individual movements of the pipe sections; and to provide a nozzle actuating mechanism for a jet deflecting device of the type having rotatably interconnected sections, wherein the nozzle actuating mechanism satisfies the technical requirements discussed above, is simple in design and low in weight, and adds as little as possible to the space required by the jet deflecting device in, for example, an aircraft tail or within an engine nacelle.

SUMMARY OF THE INVENTION

Briefly stated, in accordance with one embodiment of the invention, a nozzle actuating motor is provided on a stationary engine jet pipe. A first rotatable pipe section is coupled to the end of the stationary jet pipe, and a second pipe section is rotatably coupled to the downstream end of the first pipe section. A first annular ring gear carrier is rotatably mounted either on the outer circumference of the stationary jet pipe or on the outer circumference of the first rotatable pipe section, the ring gear carrier having two ring gears. One of the ring gears is coupled to the nozzle actuating motor, and the other ring gear is coupled to a gear on the upstream end of a flexible power transfer means. The flexible power transfer means is rotatably supported on the outer circumference of the first pipe section. A gear on the downstream end of the flexible power transfer means engages a second annular ring gear carrier, which is rotatably supported on the outer circumference of the inlet end of the second rotatably mounted pipe section. Means are provided for transforming the rotation of the second ring gear carrier with respect to the second rotatable pipe section into a substantially axial reciprocating movement with respect to the access of the second rotatably mounted pipe section, and means are provided for coupling this reciprocating movement to vary the nozzle flap position on nozzle flaps at the end of the second pipe section in order to increase or decrease the gas exit area of the nozzle.

In the arrangement in accordance with the invention, the exit area of the nozzle may thus be varied after the pipe sections have been rotated to obtain the desired direction of the exhaust gases.

In accordance with a further aspect of the invention, a disengageable coupling is provided between the nozzle drive motor and the first annular ring gear carrier, in order to prevent the invariable rotation of the nozzle drive motor upon rotation of the jet deflecting devices, i.e., upon rotation of the pipe sections.

In accordance with a further embodiment of the invention, wherein the jet deflecting device is comprised of first and second rotatable pipe sections which are separately rotated through equal or different angles of rotation by separate drive motors and separate gear sets on the stationary engine jet pipe, an additional electronic control means is provided to prevent interference between the nozzle actuation and the rotation of the pipe section. The control means determines the respective speed values of the nozzle drive motor from the superimposed respective speeds and senses the rotation of the rotatable pipe sections.

Taking into account the drive and transmission elements for the rotation of the pipes as disclosed in German Auslegeschrift No. 2,109,205 and U.S. Pat. No. 3,776,467, a suitable embodiment of the invention first supplies the driving power of the nozzle actuating motor and of the second drive motor to a common planetary gear set. The planetary gear set is arranged so that, independently of the pipe position at any time, the power input is divided into a portion for nozzle actuation and a portion for the rotation of the second pipe section. The portion of the planetary gear set controlled by the nozzle drive motor includes means engaging the first annular ring gear carrier, while the portion of the planetary gear set driven by the second drive motor includes means engaging a further annular ring gear carrier which, in combination with the first annular ring gear carrier, comprises a differential gear arrangement.

In accordance with this latter embodiment, it is possible to adjust the nozzle for the desired gas exit area completely independently of the rotation of the pipe sections, and also to adjust the nozzle as desired simultaneously with the rotational adjustment of the pipe sections.

In accordance with a variation of the last described embodiment of the invention, in the differential gear arrangement, the further annular ring gear carrier, which is employed for the control of the rotation of the second pipe section, is rotatably mounted on the first pipe section. The first annular ring gear carrier which is employed for the control of the nozzle, is rotatably supported on the further annular ring gear carrier. This arrangement provides the advantage that the transmission system has a lesser overall volume, thus providing a more compact system.

In accordance with a still further embodiment of the invention, an angular drive device is mounted on the outer circumference of the second rotatable pipe section, the angular drive device being arranged to convert circumferentially directed rotation of the second annular ring gear into rotation of drive axes substantially at right angles to the longitudinal center line of the second rotatable pipe section. This rotation of the drive axes is transmitted by way of flexible shafts to step down gears, the step down gears in turn rotating threaded spindles. Nuts threaded on the spindles are thus controlled to move in axial directions upon rotation of the spindles. Means are provided for coupling the axial movement of the nuts to axial movement of a nozzle actuating skirt slidably held at the downstream end of the second pipe section. Nozzle flaps pivoted to the downstream end of the second pipe section are provided with curved guide cams on their outer surfaces, the curved guide cams engaging rollers on the inner surfaces of the nozzle actuating skirt, whereby axial movement of the nozzle actuating skirt in response to rotation of the nozzle drive motor effects the inward and outward movement of the nozzle flaps and hence the decrease or increase respectively of the nozzle exit area.

BRIEF FIGURE DESCRIPTION

In order that the invention may be more clearly understood, it will now be described and disclosed in greater detail with reference to the accompanying drawings, wherein.

Figure 1:
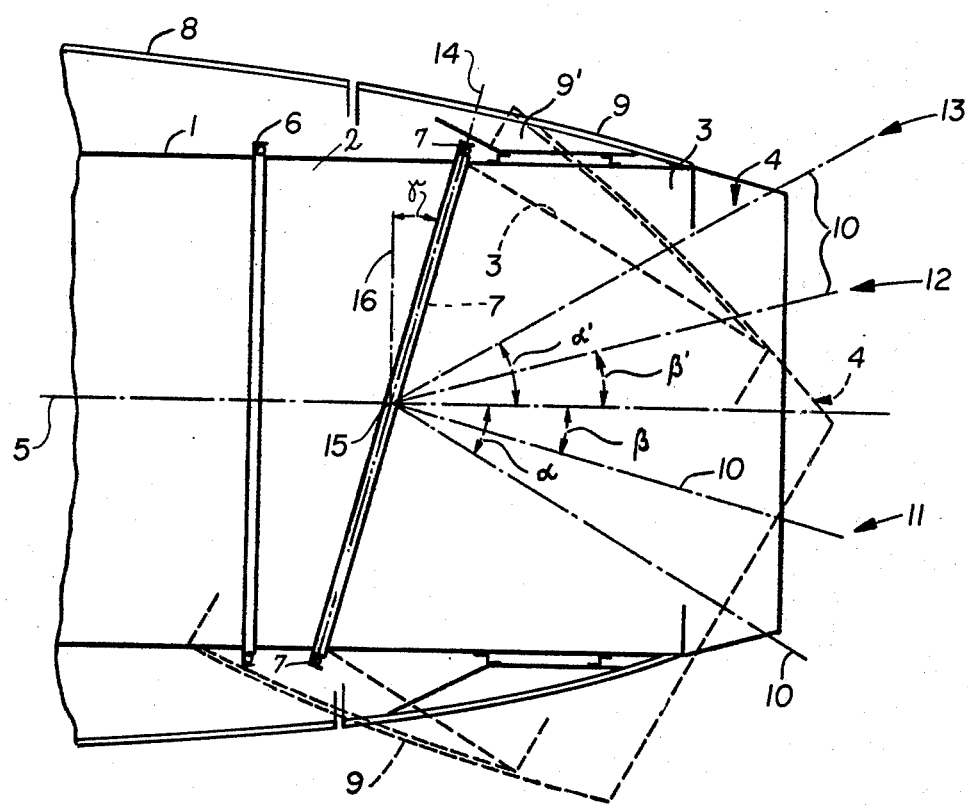
FIG. 1 is a simplified side view of a jet deflecting device which may incorporate the present invention, the figure illustrating a first jet position in solid lines and a second jet position in dashed lines.
Figure 2:
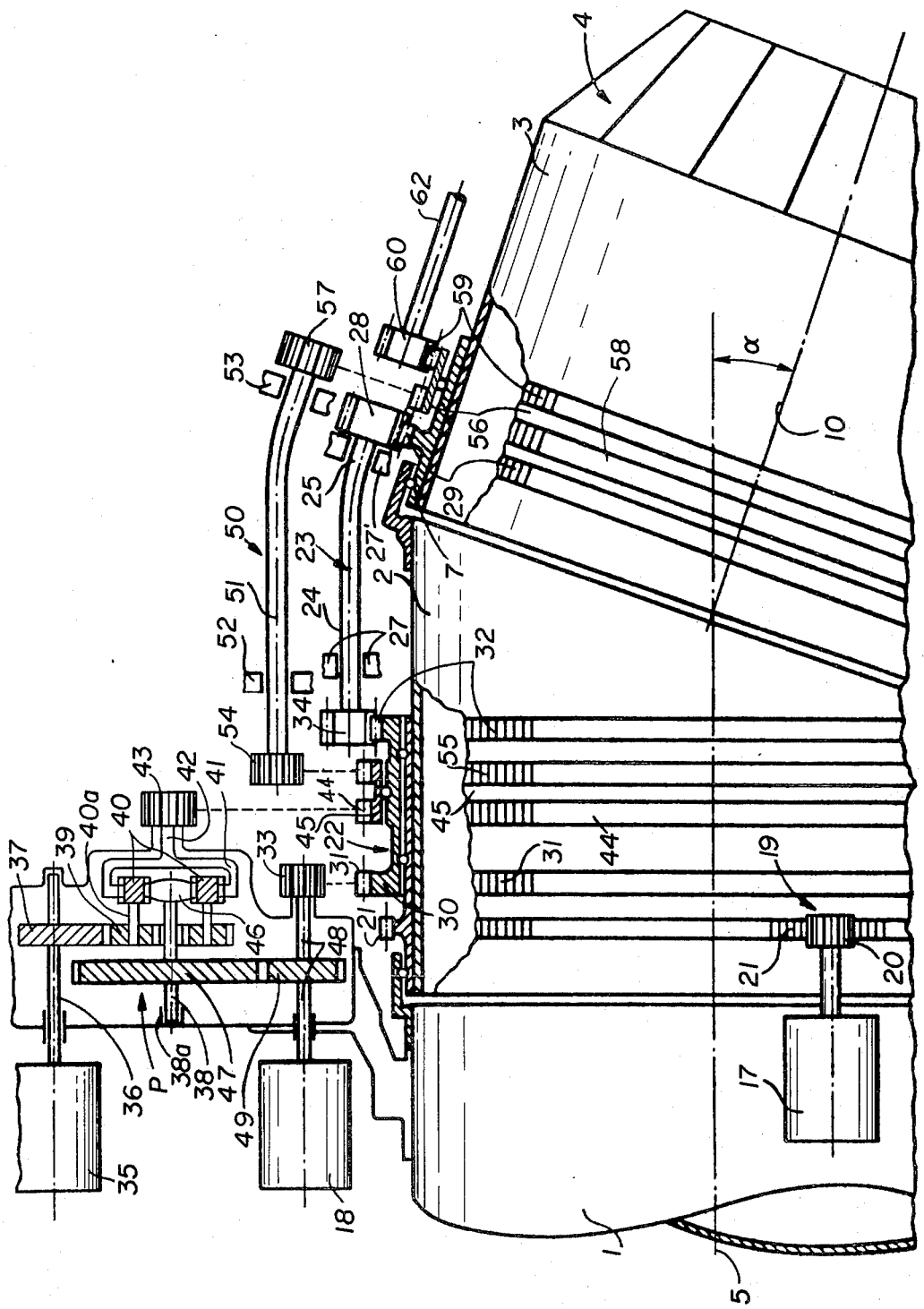
FIG. 2 is an enlarged partially cross sectional, partially broken away view of a portion of the jet deflecting device of FIG. 1, additionally showing the related drive means and actuating gears for pipe and nozzle actuation in accordance with the invention.
Figure 4:
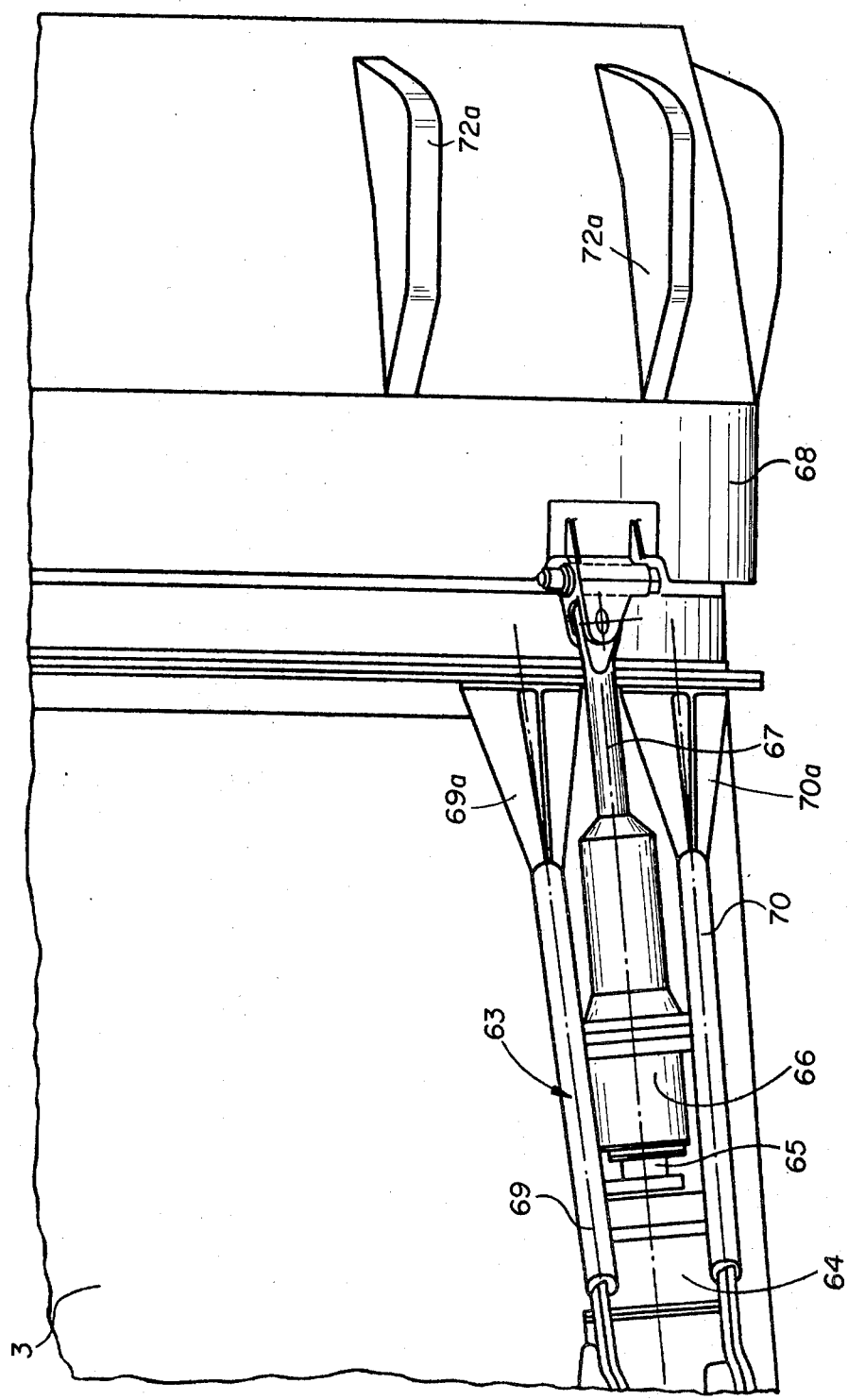
FIG. 4 is a relatively enlarged side view of a portion of the device of FIG. 1, further illustrating the details of components for transmitting the motor drive torque to the nozzle, including an actuating assembly, having a step down gear, spindle, and spherical nut, arranged on the second rotatable pipe section and adapted to be connected with the arrangement illustrated in FIG. 3.
Figure 5:
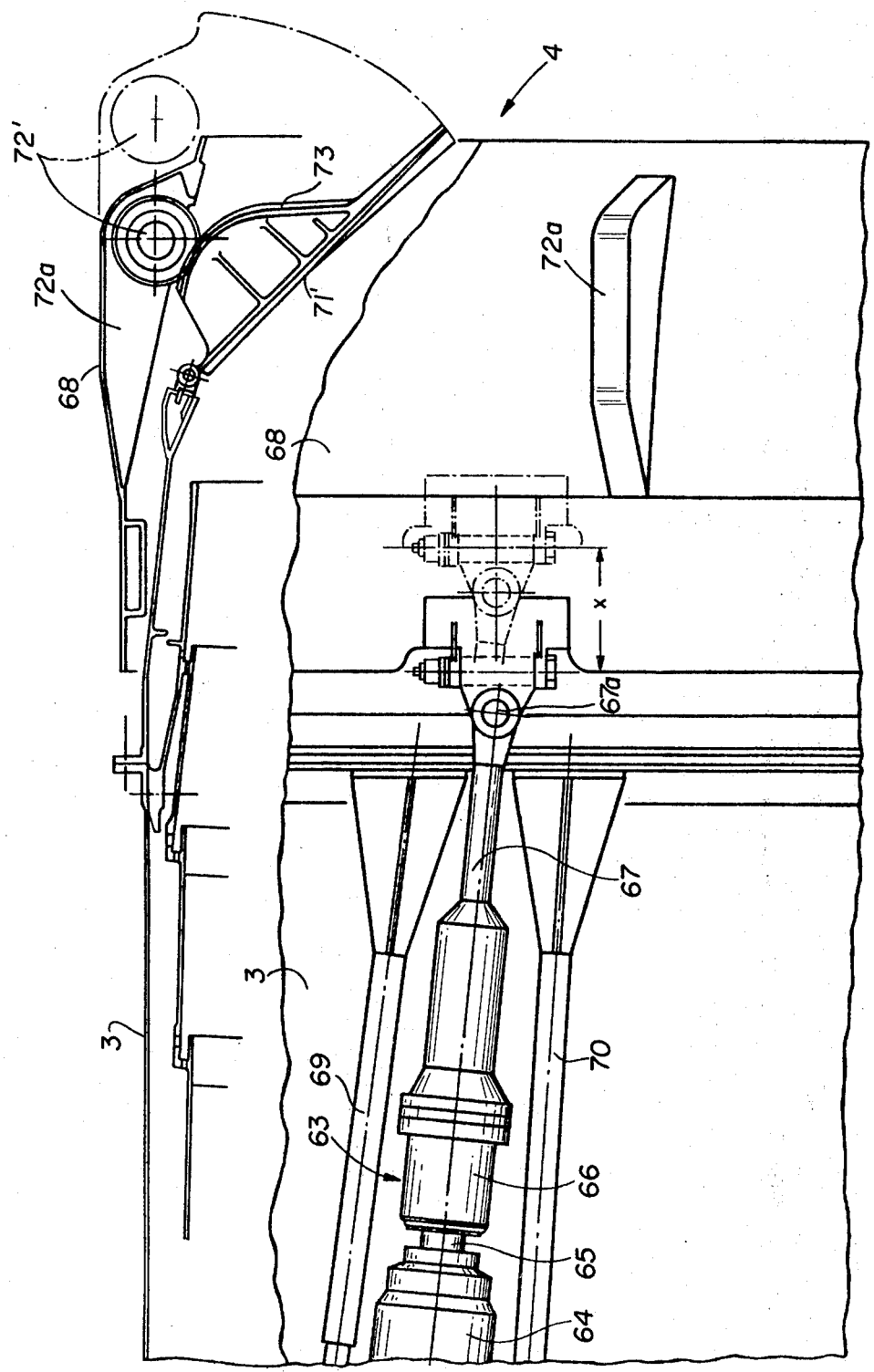
Figure 6:
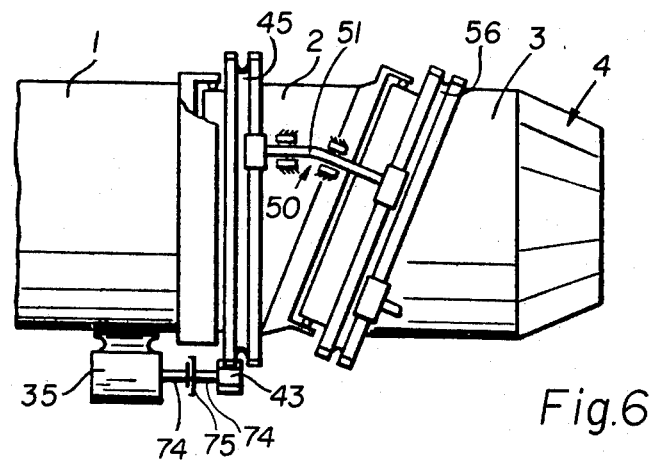
Figure 7:
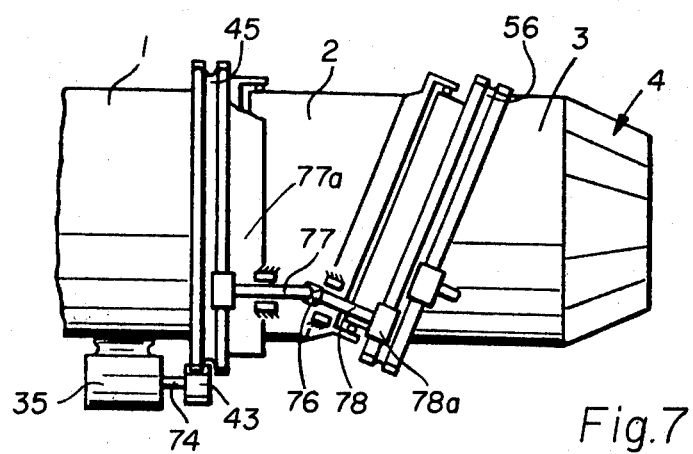
Figure 8:
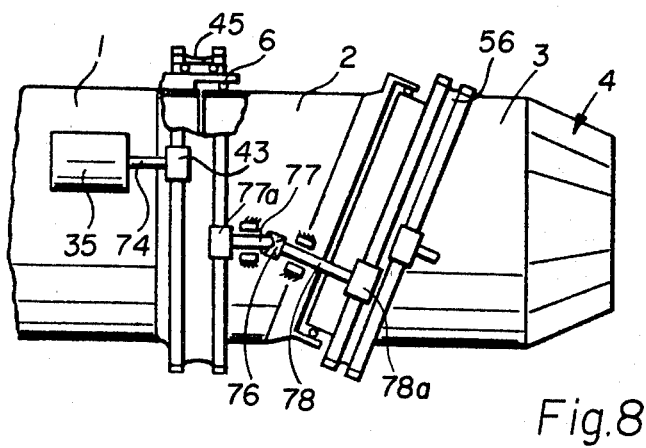
Figure 9:
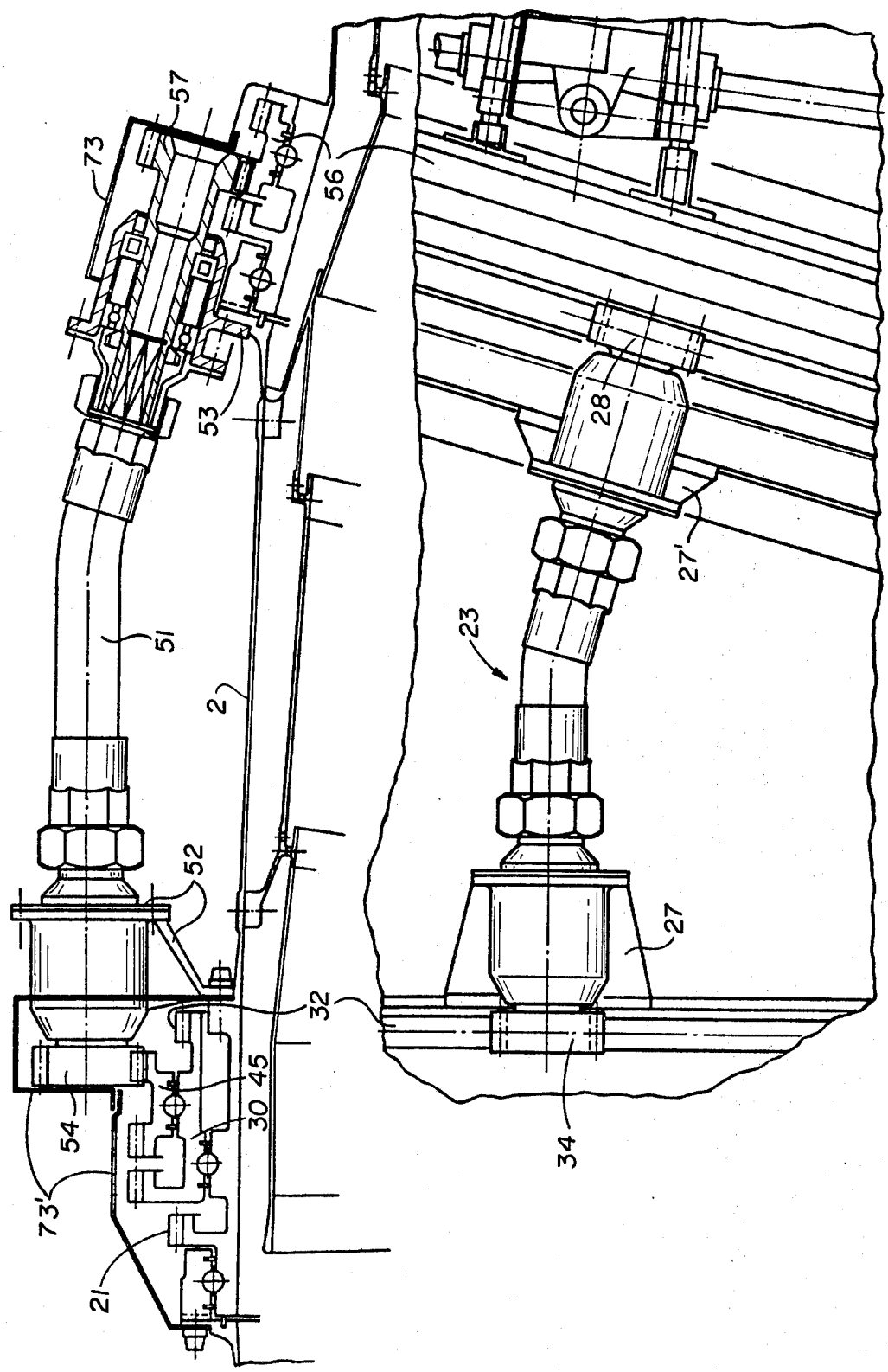
Figure 10:
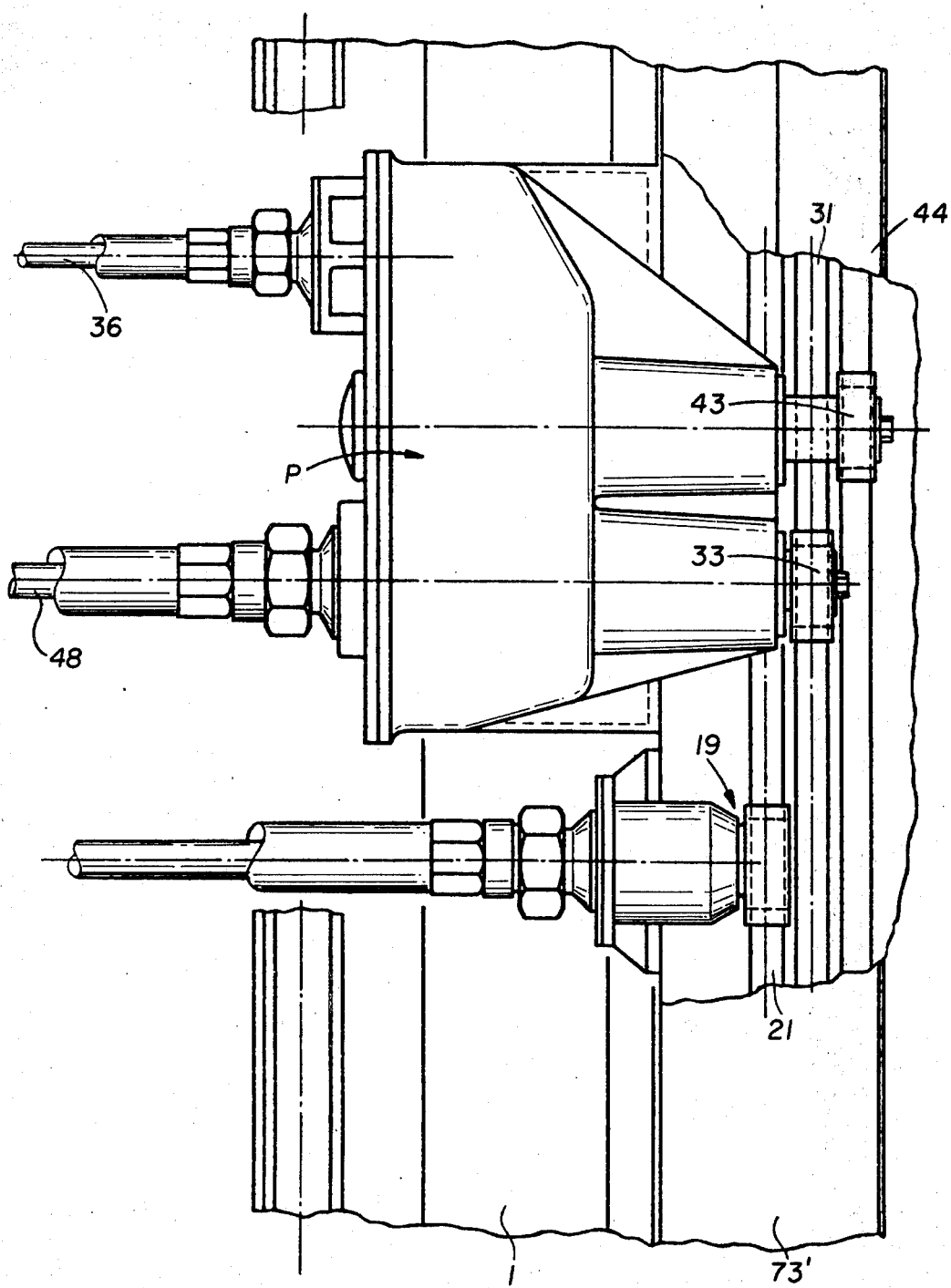

FIG. 5 is an enlarged partially broken away, partially cross sectional side view of a portion of the device of FIG. 1 and further illustrating the cooperation of the actuating assembly of FIG. 4 with the nozzle by means of details shown on the second rotatable pipe section, the parts being broken away from the pipe section along its center line for a better showing of the nozzle flap actuating system;

FIGS. 6, 7 and 8 are partially broken away top views of a jet deflection device illustrating second, third and fourth embodiments of a nozzle actuating device in accordance with the invention;

FIG. 9 is a relatively enlarged, partially broken away, partially cross sectional view of a power transfer means for nozzle actuation and rotation of the second pipe section of the jet deflection device illustrated in FIG. 2; and FIG. 10 is a relatively enlarged partially broken away view of the details of a portion of the arrangement of FIG. 2, illustrating the planetary gear set arranged at the side of the stationary engine jet pipe together with the associated drive and transmission elements for rotating the first rotatable pipe section of the jet deflecting device.

DETAILED DESCRIPTION OF EXAMPLE EMBODIMENTS

FIG. 1 illustrates in simplified form a jet deflection device for a turbo-jet engine (not shown). The device comprises an engine jet pipe 1 adapted to be coupled with its upstream end to a turbo-jet engine. By "upstream" is meant the left-hand side of the figure. The downstream end of the jet pipe is rotatably coupled to a pipe section 2 by means of a bearing 6. The downstream end of the jet pipe 1 is in a plane extending normal to the center line 5 of the engine and jet pipe 1, and the bearing 6, which may be of conventional nature, joins the adjacent ends of the pipe 1 and the pipe section 2, whereby the pipe section 2 is rotatable about the engine center line 5. The bearing 6 is preferably a sealed bearing to prevent the escape of gases therethrough. The upstream end of the pipe section 2 is thus also in a plane normal to the engine center line 5. The downstream end of the pipe section 2 is in a plane which is at an angle to the center line 5.

A further pipe section 3 is rotatably interconnected with the downstream end of the pipe section 2, by means of a bearing 7. The bearing 7 is similar to the bearing 6, as above described. The upstream end of the pipe section 3, rotatably coupled to the pipe section 2, is in a plane at an angle γ to a line perpendicular to the axis of this pipe section and in the position of the pipe section 3 illustrated in FIG. 1, it is apparent that the axis of the pipe section 3 is in line with the engine center line 5.

An engine fairing 8 is fixedly, coaxially mounted with respect to the pipe 1, the fairing 8 forming part of the tail of an aircraft in which the jet engine is mounted. The fairing 8 extends downstream of the pipe 1, so that it surrounds a portion of the pipe section 2, whereby a space is provided between the fairing 8 and the outer surfaces of the pipe 1 and pipe section 2. The fairing 8 is tapered, and the taper of this fairing is continued in a further separate fairing 9 connected to the pipe section 3 by means of suitable conventional fastening elements 9'. In the solid line positions of the pipe section 3 and nozzle 4 illustrated in FIG. 1, which is the commonly employed end position of the sections for cruising or high speed flight, the fairing 9 thus forms a flow promoting continuation of the engine fairing 8. When the pipe section 3 and the nozzle 4 are moved to an end position shown in dashed lines in the figure, for a diagonally downward direction of exhaust of the engine gas, the fairing 9 affixed to the pipe section 3 is separated from the fairing 8 at the upper portion thereof, and the lower portion of the fairing 9 shifts into the free space between the interior wall of the engine fairing and the jet pipe 1 and pipe section 2.

The pipe sections 2 and 3 are adapted to be separately rotated, as will be explained in greater detail in the following paragraph, so that the axis of the pipe section 3 rotates in a vertical plane, thereby enabling the direction of the exhaust gases from the jet engine at desired upward or downward angles, or straight to the rear as illustrated in FIG. 1 in solid lines. In the dashed line position of the pipe section 3 illustrated in FIG. 1, the axis 10 of this pipe section is directed downwardly at an angle $\alpha$. This position corresponds to the maximum displacement of the axis of the pipe section 3 in the downward direction, and is achieved by rotation of the pipe section 2 90° in one direction and the rotation of the pipe section 3 90° in the opposite direction. FIG. 1 further illustrates an axis 13 at an angle $\alpha'$ to the center line 5, which corresponds to the maximum displacement of the axis of the pipe section 3 in the upward direction. In addition, the axis positions 11 and 12 are shown, at angles $\beta$ and $\beta'$ respectively, with respect to the center line 5, these angles corresponding to intermediate positions of the axis of the pipe section 3. The angles of inclination $\alpha$, $\alpha'$, $\beta$ and $\beta'$ of the center line 10 of the pipe section 3 lie in the plane of the drawing, and the displacement of the pipe section 3 to these angular positions is effected by the simultaneous rotation of the pipe sections 2 and 3 in opposite directions through the same angle, whereby the pipe section 3 and the nozzle 4, and the exhaust gas issuing from the latter, are rotated in a vertical plane extending through the engine center line 5.

The maximum practicable jet deflection angles $\alpha$ or $\alpha'$ between the engine center line 5 and the common center line 10 of the pipe section 3 and nozzle 4 depend, among other facts, upon the selected angle of inclination $\gamma$ between the inclined plane 14 of the bearing 7 and a plane 16 normal to the center line 5 and extending through the center 15 of the bearing 7 and the engine center line 5, whereby the angle $\gamma$ is equal to $\alpha/2$. The plane 14, in FIG. 1, is illustrated with respect to the position of the plane as rotated with the pipe section 3 to the dashed line position.

Assuming that an angle of inclination of $\gamma$ of 15° is provided, the angle $\alpha$ of maximum displacement is thus 30° with respect to the center line 5, and similarly, if an angle of inclination of $\gamma = 45°$ is provided, the angle $\alpha$ of maximum displacement is equal to 90°. The maximum displacement position of the axis 10 of the pipe section 3 is thereby obtained by rotating, preferably simultaneously the pipe sections 2 and 3 in opposite directions, each through an angle of 90°.

The present invention also provides means for swivelling the gas jet in any direction, i.e. so that the axis of the pipe section 3 may be displaced horizontally as well as vertically. This enables the arrangement to be employed in the tail of an aircraft to replace conventionally employed rudders and elevators. This assumes that the gas jet from the engine is not only rotated in the plane of the drawing of FIG. 1, but that it may be additionally swivelled out of the plane of the drawing, i.e., with respect to the engine center line 5, so that horizontal and/or vertical displacement in any desired direction may be achieved. The pipe sections 2 and 3 are rotatable with respect to one another through different angles and at different rates. An actuating device for rotating the pipe sections 2 and 3 is illustrated in FIG. 2, wherein relatively simple means are provided to rotate the pipe sections 2 and 3 separately through either the same or different angles.

FIG. 2 illustrates the pipe sections 2 and 3 at their angular displacement wherein the axis 10 of the pipe section 3 is at the maximum angle $\alpha$ in the downward direction with respect to the center line 5. As illustrated in FIG. 2, motors 17 and 18 are mounted in fixed positions externally of the engine jet pipe 1 by suitable conventional means. These motors may be air motors, hydraulic motors, or electric motors. The motor 17 is provided with a pinion 20, which engages a ring gear 21 fixedly mounted to surround the outer circumference of the pipe section 2 near its inlet or upstream end. The drive motor 18 is connected to a planetary gear set P, which will be described more fully in the following paragraph. The motor 18 is also provided with a pinion 33, which engages a ring gear 31. The ring gear 31 is mounted on an annular ring carrier 30, which is rotatably mounted on the outer circumference of the pipe section 2, a ring gear 32 also being provided on the carrier 30 at the end thereof away from the pipe 1. A gear 34 engages the ring gear 32, the gear 34 being mounted at one end of a transfer means 23 for transferring rotary motion across the bearing 7. Thus, the transfer means 23 is rotated from the motor 18 by way of the pinion 33, ring gear 31, carrier 30, ring gear 32 and gear 34, the rotation of these elements being independent of the pipe section 2.

The transfer means 23 comprises a flexible shaft having a first end 24 extending in parallel with the engine center line 5 and a second portion 25 with an inclination related to the inclination of the plane 14 of the bearing 7. The flexible shaft 23 is suspended and supported by shaft supports 27 and 27' which are attached by suitable means to the exterior of the pipe section 2. The angular ring gear carrier 30 forms a portion of a differential gear set 22, which will be discussed in greater detail in the following paragraph.

The pinions 33 and 34 may conveniently have the same diameters and numbers of teeth, and similarly the ring gears 31 and 32 may also conveniently have the same diameters and numbers of teeth. Alternately, the gear ratio of pinion 33 to ring gear 31 and of pinion 34 to ring gear 32 may be the same.

A ring gear 29 is secured to the pipe section 3 adjacent its inlet end and a pinion 28 is provided on the end portion 25 of the transfer means 23, whereby the pipe section 3 may be rotated by the motor 18 independently of the rotation of the pipe section 2. The gear ratio between the gear 28 and the ring gear 29 may be selected to correspond to that of the pinions 33, 34 with respect to their ring gears 31, 32. In order to provide a circular bearing 7 at the angle of inclination γ of plane 14 of this bearing 7, as described in FIG. 1, the cross sections of the pipe sections 2 and 3 may be slightly elliptical, at least in the area of this bearing.

As a consequence of the arrangement above described with reference to FIG. 2 and the arrangement of the differential gear set 22 and transfer means 23, it is apparent that the pipe sections 2 and 3 can be rotated jointly through equal or different angles of rotation. The pipe sections 2 and 3 can also be rotated completely independently of one another such that, when it is desired to rotate the pipe section 3 without rotation of the pipe section 2, no forced motion of the first drive motor 17 results. Similarly, when it is desired to hold pipe section 3 and rotate pipe section 2, no forced motion of the second drive motor 18 results.

In order to simultaneously rotate the pipe sections and actuate the nozzle, torque from a nozzle actuating motor 35 is also directed to the common planetary gear set P. The planetary gear set P divides the power without effect of the pipe rotation, for nozzle actuation on the one hand, and rotation of the second rotatable pipe section 3 on the other. The nozzle drive motor 35, which may also be an air, hydraulic, or electric motor, is fixedly mounted with respect to the engine jet pipe 1.

In order to actuate the nozzle 4, the nozzle drive motor 35 is provided with a shaft 36 extending into the gear set P with a gear 37 being provided on the shaft 36, the gear 37 meshes with a gear 39 supported by means of a ball bearing on an internal shaft 38 of the planetary gear set P. The gear 39 carries a plurality of pinions 40 which are rotatably mounted on respective shafts 40a displaced from the axis of the gear 39 at equal distances. The pinions 40 in turn mesh with the internal teeth of a ring gear 41, the ring gear 41 being connected by way of a shaft portion 42, to a gear 43. The gear 43 meshes with a ring gear 44 on an annular ring gear carrier 45, the carrier 45 being rotatably mounted with respect to the pipe section 2, for example, forming a separately rotatable portion of the gear set 22. A further ring gear 55 is provided on the ring gear carrier 45, the ring gear 55 being located toward the downstream end of the pipe section 2.

The pinions 40 also mesh with the teeth of a sun gear 46 connected to an inner shaft 38, the shaft 38 extending through the axis of the gear 39 and being freely rotatable with respect to the gear 39. The shaft 38 thus may form a rotatable support for the gear 39. The shaft 38 is rotatably supported in the gear set P, for example, as illustrated at 38a.

A further gear 47 is provided on the shaft 38, on the opposite side thereof as the sun gear 46, the gear 47 meshing with a gear 49 on the output shaft 48 of the drive motor 18.

In order to actuate the nozzle 4, a flexible power transfer means 50, in the form of a flexible shaft 51, is positioned at the outer circumference of the first rotatable pipe section 2, in bearings 52, 53 for rotation at the circumference of the pipe section 2. A gear 54 is provided on the upstream end of the flexible shaft 51, the gear 54 engaging the second ring gear 55 on the ring gear carrier 45 for the actuation of the nozzle.

The torque produced by the nozzle drive motor 35 is thus directed by way of the flexible shaft 51, to a gear 57 at the downstream end of the flexible shaft 51. The gear 57 meshes with the first ring gear 58 of a second annular ring gear carrier 56 rotatably mounted on the pipe section 3. The second ring gear 58 on the ring gear carrier 56 meshes with a pinion 60, for actuation of the nozzle in a manner to be described in greater detail in the following paragraphs.

In the arrangement illustrated in FIG. 2, the planetary gear set P, and the transfer means 50 and associated gears 54 and 57 are shown rotated out of their normal positions in order to facilitate the description of the arrangement of the gears. The actual arrangement of the planetary gear set P, with respect to the ring gears 21, 31, and 44, is shown more clearly in FIG. 10, wherein it is apparent that these ring gears mesh respectively with the gears 19, 33, and 43. It is further apparent that the other gears 54 and 57 shown in displaced positions in FIG. 2 are mounted by suitable means to mesh with their respective ring gears 55 and 58 respectively.

Figure 3:
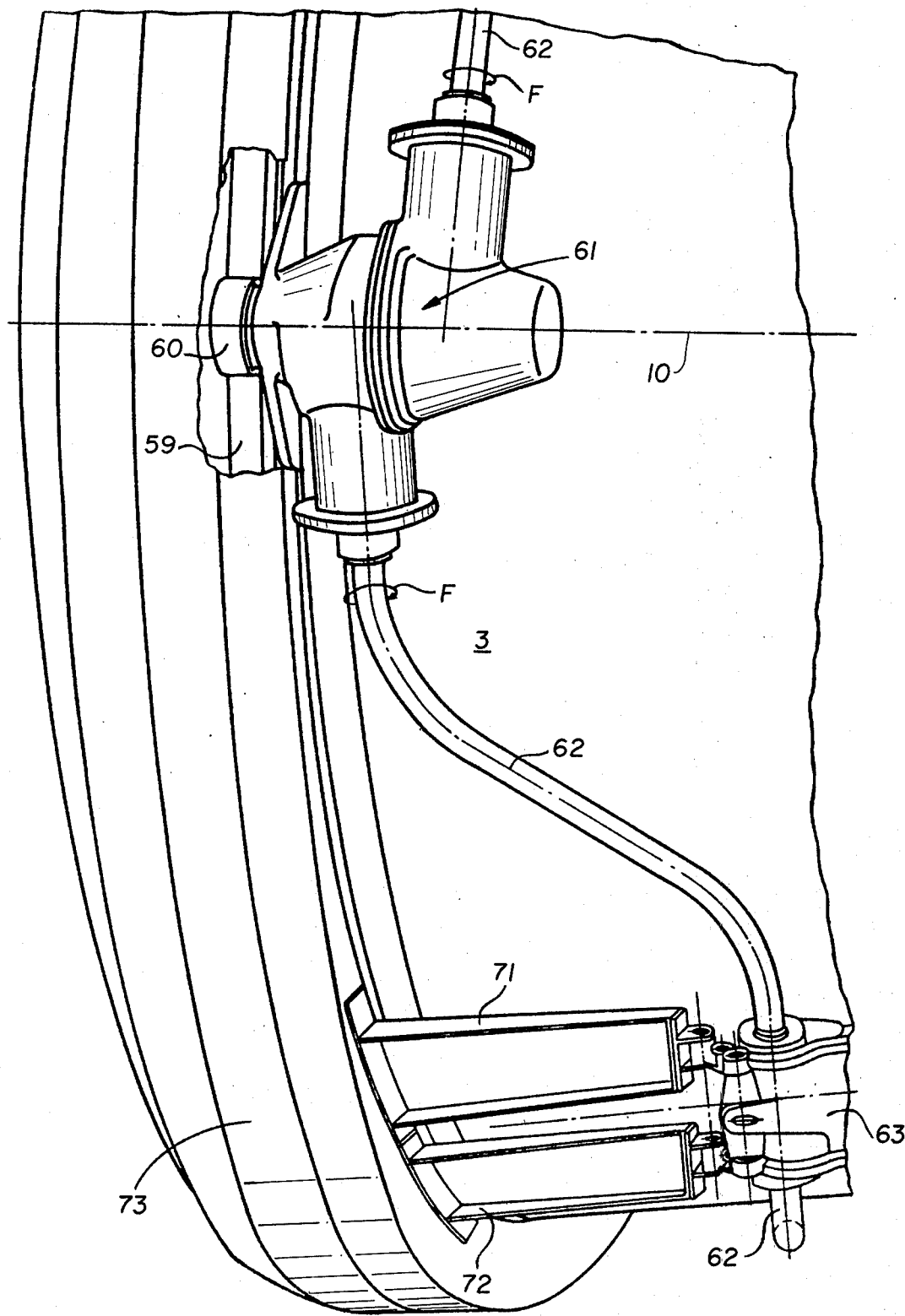
FIG. 3 is a relatively enlarged partially broken away perspective view of a portion of the device of FIG. 1, additionally illustrating angular drives and flexible shafts on the second rotatable pipe sections for transmitting motor drive torque to the nozzle.

Referring now to FIG. 3, the gear 60, which engages the second ring gear 59 of the second annular ring gear carrier 56, is coupled to an angular drive mechanism 61 affixed to the outer circumference of the pipe section 3. The drive device 61 converts the rotation of the ring gear 59, which runs in the circumferential direction of the pipe section 3, into corotational revolutions of drive axes (arrows F), which run essentially at ring angles to the longitudinal center line 10 of the second pipe section 3, thereby transmitting the rotation to a plurality of flexible shafts 62.

The flexible shafts 62 are coupled to a number of nozzle actuation assemblies 63 arranged on the outer circumference of the pipe section 3, the actuating assembly 63 being illustrated in FIGS. 3 to 5. It is thus apparent that the left side of FIG. 4 corresponds to the right side of FIG. 3. In FIGS. 3 and 4, it is seen that the actuating assemblies 63 are comprised of a pair of lateral support rods 69 and 70. The support rods 69 and 70 are connected at the downstream end of pipe 3 by means of flanges 69a and 40a respectively. The upstream end of the support rods 69 and 70 are flexibly suspended from fasteners 71, 72 respectively, as illustrated in FIG. 3, these fasteners being secured to a sleeve 73 which covers and protects the gear sets arranged in the area of the bearing 7 (FIG. 2) and on the outer circumference of the inlet end of the pipe section 3. As illustrated in FIG. 3, the flexible shafts 62 extend to the nozzle actuating assemblies 63 (only one of which is shown) and therein effect the rotation of a step down gear 64 by suitable conventional means. The step down gear 64 drives a threaded spindle 65 for example, a ball screw spindle, on which is positioned a threaded nut 66, for example, a ball screw nut, the nut 66 being connected to a rod 67. The rod 67 is pivotally connected at a hinge assembly 67a to the upstream edge of a nozzle actuating skirt 68. The nozzle actuating skirt 68, as is apparent in FIGS. 4 and 5, is an annular member slidingly held at the downstream end of the pipe section 3, whereby rotation of the spindle 65 effects the forward and backward movement of the nozzle actuating sleeve at the downstream end of the pipe section 3.

A sleeve 73', as illustrated in FIG. 9, may be provided to cover the gear sets on the outer circumference of the pipe section 2, in a similar manner to the sleeve 73 shown in FIG. 3 for covering the gear sets at the outer circumference of the pipe section 3.

Referring now to FIG. 5, a plurality of nozzle flaps 71' are pivotally connected, for example, by way of suitable interconnecting members, to the downstream end of the pipe section 3. The outer surfaces of the nozzle flaps 71' are provided with radially extending curved guide cams 73. The inner surfaces of the nozzle actuating skirt 68 are provided with rollers 72', positioned to engage the curved guide cams 73 on the nozzle flaps 71'. Gas pressure prevailing inside of the pipe section 3 urges the nozzle flaps 71' outwardly, to thereby urge the guide cam 73 thereon against the rollers 72'. As a consequence, it is apparent that back and forth movement of the nozzle actuating skirt 68, in response to rotation of the spindle 65, controls the angular position of the nozzle flaps 71'. Thus, as illustrated in FIG. 5, the nozzle flap 71' is shown in its extreme inward position, where it extends the furthest into the stream of the exhaust gas to hence produce the smallest possible nozzle exit area.

The distance $x$ in FIG. 5 indicates the maximum possible travel of the nozzle actuating skirt 68, in response to movement of the rod 67 for moving the nozzle 4 from the extreme restricted to the extreme open position or vice versa.

As illustrated in FIG. 5, the rollers 72' may be rotatably mounted in outwardly extending recesses 72a in the nozzle actuating skirt 68.

FIGS. 6, 7 and 8 illustrate further embodiments of the nozzle actuating mechanism of FIGS. 1 to 5, the same reference numerals being employed in these figures for portions thereof which correspond to the arrangement of FIGS. 1 to 5. FIGS. 6 to 8 are top view of the device of the type illustrated in FIG. 1, incorporating the nozzle control features in accordance with the invention.

The embodiments of the invention illustrated in FIGS. 6 to 8 are assumed to employ a rotating mechanism for the pipe sections 2 and 3 of the type shown in FIG. 2, and also shown in German Patent Publication No. 2,056,088, although without using the planetary gear set P of FIG. 2 or an electric control means as initially discussed herein. The nozzle 4, in the arrangements of FIGS. 6 to 8 can be operated by means of the nozzle drive motor 35 after the jet has first been set to its desired direction.

In the arrangement of FIG. 6, the nozzle drive motor 35 is fixed with respect to the outside of the pipe 1, the motor 35 being coupled by way of a coupling 75 to the pinion 43. The pinion 43 meshes with the ring gear at the upstream end of annular ring gear carrier 45 rotatably mounted on the pipe section 2. The downstream ring gear on the ring gear carrier 45 meshes with a gear on the flexible shaft 51, in order to control the nozzle. The coupling 75 is incorporated in the shaft 74 in the arrangement of FIG. 6, in order to prevent positive connection between the nozzle drive motor 35 and the associated actuating drives for purposes other than nozzle actuation. Thus, in the arrangement of FIG. 6, the coupling 75 is controlled to couple the pinion 43 to the drive motor 35 only when it is desired to actually control the flaps, the pipe sections 2 and 3 being rotated to their desired positions with the coupling 75 open.

As illustrated in FIG. 7, the annular ring gear carrier 45 may be rotatably mounted on the outer circumference of the outward end of the engine jet pipe 1, and as illustrated in FIG. 8, the annular ring gear carrier 45 may alternatively be mounted on the bearing 6 between the outlet port of the engine jet pipe 1 and the inlet port of the first rotatable pipe section 2. The coupling 75 may also be provided in the arrangements of FIGS. 7 and 8.

It is not necessary to employ the actuating mechanism of the type illustrated in FIG. 2 for controlling the rotation of the pipe sections 2 and 3, and it is further apparent, in accordance with the invention, that the use of a planetary gear P arrangement as illustrated in FIG. 2 is also not necessary, since the arrangements of FIGS. 6 to 8 do not require the use of such a planetary gear.

FIGS. 7 and 8 also show a variation of the means for transferring the motor torque from the first annular ring gear carrier 45 to the second annular ring gear carrier 56 for the actuation of the nozzle. Thus, as illustrated in FIGS. 7 and 8, the transferring means may be comprised of two shafts 77 and 78, coupled together by means of a ball and socket type joint 76, with the upstream end of shaft 77 carrying a gear 77a meshing with the downstream ring gear of the ring gear carrier 45, and the shaft 78 carrying a gear 78a meshing with the upstream ring gear of ring gear carrier 56.

The nozzle actuation of the embodiments of the invention illustrated in FIGS. 6 to 8, for the portion of the arrangement between the ring gear carrier 56 and the nozzle, may be effected in the same manner as illustrated in FIGS. 3 to 5.

The inventive concept does not depend upon the manner of nozzle actuation, and the arrangement of the nozzle proper as illustrated in FIGS. 3 to 5. Thus, the nozzle flaps illustrated in FIGS. 3 to 5, which are pivoted about transverse axes, can be replaced, for example, by nozzle flaps which are equally spaced on the outlet end of the second rotatable pipe section and are deployed by way of rolling or sliding means downstream into the gas stream along a tapering course, as is disclosed for example, in U.S. Pat. No. 3,685,738 or U.S. Pat. No. 3,642,209.

Alternatively, any other means for converting rotation of the second annular ring gear carrier for nozzle actuation into translation for nozzle actuation may be employed in lieu of the actuating assemblies on the second rotatable pipe section as illustrated in FIGS. 4 and 5. Thus, the angular drive on the second rotatable pipe sections may be coupled to the nozzle flaps by way of linkages, or the torque produced by nozzle actuation by the second annular ring gear carrier may be directed to suitable hydraulic or pneumatic operating members for producing torque required for the actuation of the nozzle.

Although the invention has been described with reference to specific example embodiments, it is to be understood, that it is intended to cover all modifications and equivalents within the scope of the appended claims.

What is claimed is:

1. An apparatus for the adjustment of the rotational position of a jet deflection device and for the adjustment of the exit area size of a nozzle forming part of said jet deflection device, comprising a stationary jet pipe section (1), a first rotatable jet pipe section (2) rotatably secured to said stationary jet pipe section, a second rotatable jet pipe section (3) rotatably secured to said first rotatable jet pipe section, and a nozzle secured to said second rotatable jet pipe section, a first drive motor (17) and first power transmission means (20, 21) operatively interconnecting said first drive motor and said first rotatable jet pipe section (2) for rotating the latter relative to the stationary jet pipe section (1), a second drive motor (18) and second power transmission means (31, 32, 33, 34, 23, 28, 29) including first flexible means operatively interconnecting said second drive motor and said second rotatable jet pipe section (3) for rotating the latter relative to the first rotatable jet pipe section (2); area size adjusting means (68, 72, 73) and a third drive motor (35) as well as third power transmission means (P, 43, 45, 55, 54, 50, 57, 48, 59...), including second flexible means operatively interposed between said third drive motor (35) and said area size adjustment means, whereby said rotating of said first and second jet pipe sections and said area size adjustment may be made independently of each other and in any position of said rotatable jet pipe sections.

2. The apparatus of claim 1, further comprising planetary gear means (P) operatively interposed between said second and third power transmission means on the one hand and the second and third drive motors on the other hand.

3. The apparatus of claim 1, further comprising differential gear means (22) in said second power transmission means.

4. The apparatus of claim 1, wherein all three drive motors are secured to said stationary jet pipe section (1), whereby said area size adjustment extends across the length of said rotatable jet pipe sections (2, 3).

5. An apparatus for varying the size of the gas exit area of an exhaust nozzle (4) comprising a jet deflecting device including a stationary jet pipe (1), a first rotatable jet pipe section (2) and a second rotatable jet pipe section (3), bearing means rotatably interconnecting said first and second rotatable jet pipe sections (2, 3) and said stationary jet pipe (1), said apparatus further comprising a nozzle actuating means (35) mounted on said stationary jet pipe, a first ring gear carrier (45) rotatably supported on said jet deflecting device, said first ring gear carrier (45) having first (44) and second (55) ring gears (44, 55), gear means (43) coupling said first ring gear (44) to said nozzle actuating means (35), flexible power transfer means (50) including gear means (54) at its upstream end engaging said second ring gear (55), a second ring gear carrier (56) with respective gear means (58, 59) for adjusting the gas exit area of the nozzle and rotatably supported on said second rotatable pipe section (3), further gear means (57) on the downstream end of said flexible power transfer means (50) engaging the gear means (58) of said second annular ring gear carrier (56), means (60, 61) operatively connected to said gear means (59) for transforming the rotational movement of said further gear means (57) into substantially axial, reciprocating motion with respect to said second pipe section, and adjustment means (63, 68, 72', 73) responsive to said transforming means for controlling the size of the gas exit area of said exhaust nozzle (4).

6. The apparatus of claim 5, further comprising a disengageable coupling (75) between said nozzle actuating means (35) and said first ring gear carrier (45).

7. The apparatus of claim 5, wherein said means (59, 60, 61) for tranforming rotational movement comprises an angular drive device (61) mounted on the outer circumference of said second rotatable pipe section (3), said angular drive device (61) including drive axes and converting circumferentially directed rotation of said second ring gear carrier (56) into rotation of said drive axes extending substantially at right angles to the longitudinal center line of said second rotatable pipe section (3), flexible shaft means (62) for transmitting the rotation of said drive axes, step down gear means (64) coupled to said flexible shaft means (62), ball thread spindle means (65) coupled to said step down gear means (64), ball thread nut means (66) on said ball thread spindle means (65), and positioned to move axially of said longitudinal center line of said second pipe section (3) in response to rotation of said ball thread spindle means (65), an axially slidable nozzle actuating skirt (68) mounted on the downstream end of said second pipe section (3) and coupled to said ball thread nut means (66) for axial movement, nozzle flaps (71') pivoted to said nozzle (4) and having curved guide cams (73) on their outer surfaces, and roller means (72') on the inner surfaces of said actuating skirt (68) for engaging said curved guide cams (73), whereby rotation of said nozzle actuating means (35) controls the size of the exit area of said exhaust nozzle (4).

8. The apparatus of claim 5, wherein said flexible power transfer means (50) comprises a first shaft section (77) and a second shaft section (78), and a ball and socket joint (76) interconnecting said first and second shaft sections.

9. The apparatus of claim 5, wherein said flexible power transfer means comprises a flexible shaft (51).

10. An apparatus for varying the size of the gas exit area of a nozzle (4) comprising a nozzle adjustment motor (35), a jet deflecting device having an outer circumference and including a stationary jet pipe (1) having a downstream end, a first rotatable jet pipe section (2) having an upstream end rotatably secured to the downstream end of said stationary jet pipe, said first rotatable jet pipe section also having a downstream end, and a second rotatable jet pipe section (3) having an upstream end rotatably secured to the downstream end of said first rotatable jet pipe section, said second jet pipe section also having a downstream end, said nozzle being secured to the downstream end of said second rotatable jet pipe section, a first drive motor (17), gear means (22, 21) interposed between said first drive motor and said first rotatable jet pipe section for directly rotating said first jet pipe section, a second drive motor (18) including a shaft (48) carrying a pinion (33), first transmission means including differential gear means (22) operatively interposed between said second drive motor (18) and said second rotatable jet pipe section for rotating the second jet pipe section independently of the rotation of the first rotatable jet pipe section, said first transmission means including flexible means for bridging the downstream end of said first rotatable jet pipe section (2) and the upstream end of said second rotatable jet pipe section (3), said differential gear means (22) comprising a first ring gear carrier (30) rotatably secured to said outer circumference of said jet deflecting device for adjusting the position of said second rotatable jet pipe section (3), said first ring gear carrier (30) carrying a first ring gear member (31) and second ring gear member (32), said first ring gear member (31) meshing with said pinion (33) of said second drive motor, said flexible means including first rotatably supported flexible shaft means (23) and an upstream gear member (34) as well as a downstream gear member (28) secured to said first rotatably supported flexible shaft means, said upstream gear member meshing with said second ring gear member (32), a second ring gear carrier (29) rigidly secured to the upstream end of the second rotatable jet pipe section (3) and carrying a third ring gear member meshing with said downstream gear member (28) of said first rotatably supported shaft means (23), said apparatus further comprising planetary gear means (P) operatively arranged for cooperation with said nozzle adjustment motor (35) and with said second drive motor (18), said planetary gear means (P) dividing the power of said motors (18, 35) independently of the instantaneous adjustment of the rotatably supported jet pipe sections, for adjusting the rotational position of the second jet pipe section (3) and for adjusting the size of the gas exit area of said nozzle (4) independently of each other, second transmission means cooperating with said planetary gear means (P) and including further rotatably supported flexible shaft means (50) also bridging the downstream end of the first rotatable jet pipe section (2) and the upstream end of the second rotatable jet pipe section (3), as well as respective upstream (54) and donwstream (57) gear elements carried by said further flexible shaft means, a third ring gear carrier (45) carrying fourth (44) and fifth (55) gear rings as part of said second transmission means for adjusting the size of the nozzle exit area, said first transmission means (30 ...) cooperating with said planetary gear means (P) and with said second drive motor (18) as well as with said differential gear means (22) for adjusting the rotational position of said second rotatable jet pipe section (3), and area adjustment means (63, 68, 72', 73) for said nozzle responsive to said second transmission means.

11. The apparatus of claim 10, wherein said third ring gear carrier (45) is rotatably mounted on said first ring gear carrier.

* * * * *